United States Patent [19]

Horton, Jr. et al.

[11] 4,419,794

[45] Dec. 13, 1983

[54] PORTABLE FASTENING DEVICE

[75] Inventors: Harold O. Horton, Jr.; William B. Thompson, both of Orlando, Fla.

[73] Assignee: Repco Incorporated, Orlando, Fla.

[21] Appl. No.: 308,883

[22] Filed: Oct. 5, 1981

[51] Int. Cl.³ .............................................. A44B 21/00
[52] U.S. Cl. .................................... 24/667; 24/682 X
[58] Field of Search ................. 24/222, 223, 224, 226, 24/379

[56] References Cited

U.S. PATENT DOCUMENTS

| 690,277 | 12/1901 | Hatfield | 24/224 |
| 1,423,590 | 7/1922 | Zimmerman | 24/224 |
| 2,637,885 | 5/1953 | Silver | 24/224 |
| 3,170,209 | 2/1965 | Parry | 24/222 |

FOREIGN PATENT DOCUMENTS

| 919582 | 10/1954 | Fed. Rep. of Germany | 24/223 |
| 242757 | 11/1925 | United Kingdom | 24/223 |

Primary Examiner—Robert P. Swiatek
Attorney, Agent, or Firm—John E. Benoit

[57] ABSTRACT

A portable two-part fastening device having a female section including a keyhole, a spring within the female section, and a ridge supported by the spring, an open channel in the female section contiguous with the narrow dimension of the keyhole, and means for mounting the female section to one part of the device. A male section comprises a button larger than the keyhole but having a width less than the open channel, with a flattened stud connecting said button to the other part of the two device. The button has an indentation on the outer face thereof of a geometrical configuration so as to mate with the ridge on the spring. The narrow dimension of the stud has a width less than the narrow dimension of the keyhole whereby the button and the stud may be positioned such that the button passes through the open slot and the stud passes through the narrow dimension of the keyhole with the spring exerting a biasing force against the face of the button hole so that the button and stud are maintained within the female portion.

4 Claims, 5 Drawing Figures

U.S. Patent    Dec. 13, 1983    4,419,794
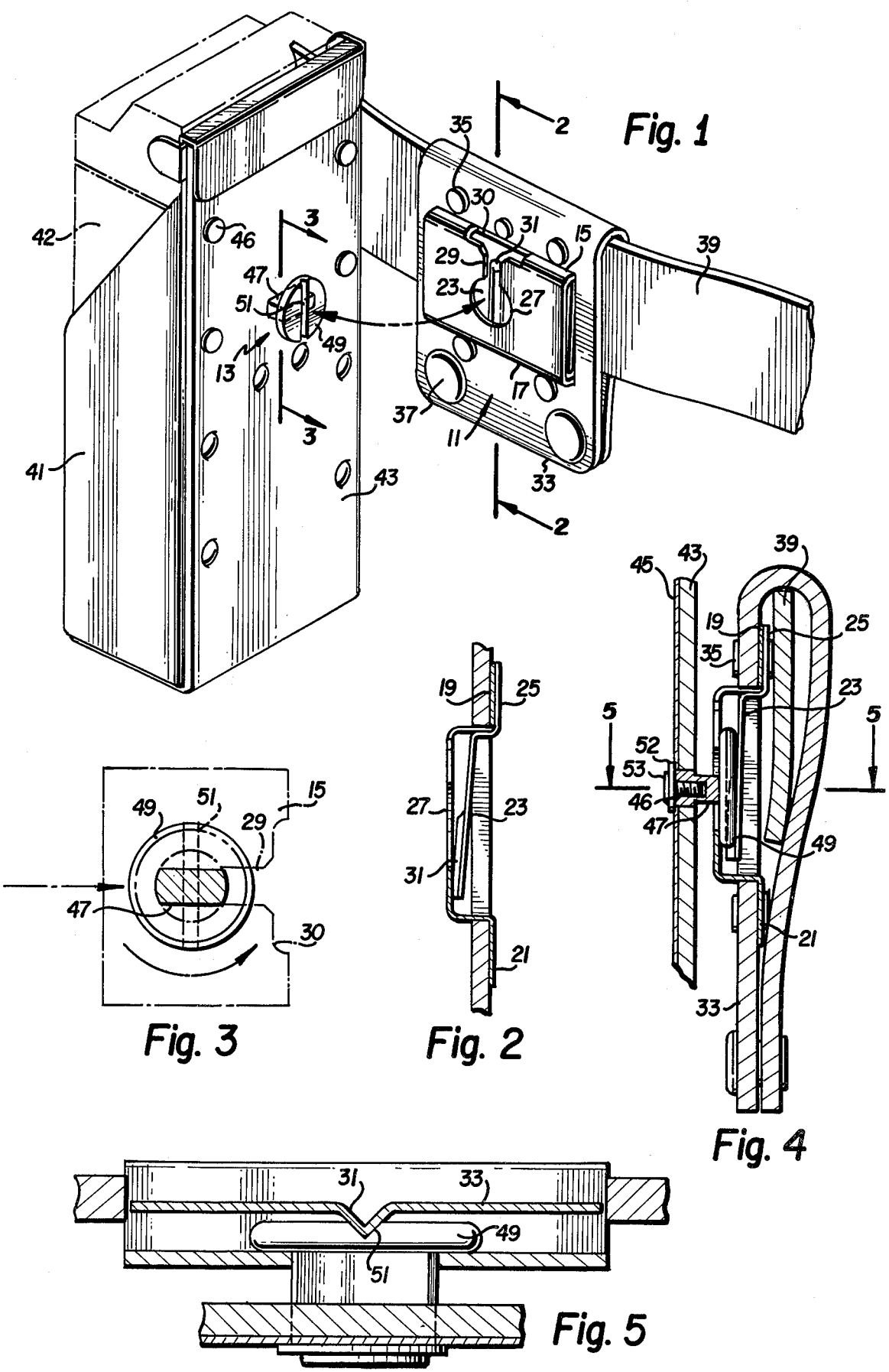

PORTABLE FASTENING DEVICE

The invention relates generally to fastening devices and particularly to fastening devices which permit the carrying and removal of portable components from a supporting structure. Such components may be physically rotated in order to allow flexibility of use.

Although the present invention is shown and described for use with a portable device which is to be worn or carried by a person, it is understood that such a device as described herein could be used for portable devices which may be easily removed from a stationary mount such as on a wall or on a dash board of a vehicle or the like.

Portable devices of the nature described herein are shown and described in U.S. Pat. No. 3,878,589 issued to Schaefer on Aug. 1, 1974. There is shown therein two objects which are fastened together by a device having a base plate with a cavity and an overhanging holder plate fastened to one object, and having a cylindrical stud with an overhanging flange fastened to the other object. The cavity, holder plate, stud, and flange are shaped so that the two objects must be oriented in a particular relation in order that the stud flange can be inserted into the cavity. After insertion, a slight relative rotation of the two objects fastens the two objects together in a pivotable rotation.

A further showing of this general device may be found in U.S. Pat. No. 3,743,147 issued to Wilczynski on July 3, 1973. He discloses a support for a carrying case for apparatus to be carried by a person which is supported on a belt or the like and permits the same to pivot with respect to the belt and to be connected thereto and detached therefrom. The support includes a receptacle secured to the belt having a non-symmetrical opening therein. The carrying case has a plate thereon with a button projecting therefrom having the same shape as the opening in the receptacle. The button can be inserted into the opening when the carrying case is in the position it will not assume during a normal use, and will be retained when pivoted to other positions which it may assume during use.

The Wilczynski patent allows freedom of movement of the carrying case for situations wherein a person is seated and the like. However, Wilczynski does not provide any device for substantially maintaining the carrying case in a stable position for normal walking bending, etc. The case is free to move and often could be annoying to anyone wearing it.

Schaefer discloses a device wherein the stud is attached directly to the portable radio and is inserted into a slot which is mounted on a loop through which a belt may pass. When the Schaefer radio is inserted into the slot, a flat side of the stud passes by the spring member which is inserted into the slot. The radio is then rotated 180° until the flat part of the slot 40 mates against the wall of the slot with the spring exerting pressure against the opposite curve side of the stud. The radio is locked in one position and, due to the construction shown, does not lend itself to use in any alternate position.

The present invention is designed so as to have the advantages described above, with a simplified construction which allows more versatility both as to the insertion and separation of the devices and the particular freedom of movement and retaining system.

A more specific object of this invention is to provide a fastening device which separately provides an ease of connection between two devices and, separately, provides a means for stabilizing the two devices when they are attached without interfering with the desired flexibility of use.

SUMMARY OF THE INVENTION

Briefly, the object of the invention is achieved by the construction of the present device which comprises a female section including a keyhole, spring biasing means within the female section, and ridge supported by the spring biasing means, an open channel in the female section contiguous with the narrow dimension of the keyhole, and means for mounting the female section to one of said devices. A male section comprises a button larger than the keyhold but having a width less than the open channel, with a flat stud connecting said button to the other one of the two devices. The narrow dimension of the stud has a width less than the narrow dimension of the keyhole whereby the button and the stud may be positioned such that the button passes through the open slot and the stud passes through the narrow dimension of the keyhole with the spring exerting a biasing force against the face of the button hole so that the button and stud are rotatable within the male portion against the force of the spring.

BRIEF DESCRIPTION OF THE DRAWINGS

FIG. 1 discloses an exploded view of the male and female connecting sections of the portable fastening device of the present invention;

FIG. 2 is a section taken along the lines 2—2 of FIG. 1; FIG. 3 is a sectional view taken along the lines 3—3 of FIG. 1;

FIG. 4 is a sectional view of the male and female sections shown in a mated position; and FIG. 5 is a partial sectional view taken along the lines 5—5 of FIG. 4.

DESCRIPTION OF A PREFERRED EMBODIMENT OF THE INVENTION

Turning now to FIG. 1, there is shown a female section 11 of the overall fastening device and a male section 13. The female section comprises clip 15 which includes C-shaped plate 17 having an upper flange 19 and a lower flange 21 as more clearly seen in FIG. 2. A spring 23 is mated with upper flange 19 by a conforming leg 25. With this type of leaf spring, the bias forces the spring 23 in a direction so as to be in contact with or very close to the face of the C-shaped plate.

Keyhole 27 includes a slot 29 extending upwardly and terminating in an open channel 30. As shown, the spring 23 has formed therein a ridge 31 which extends substantially vertically along the central portion of keyhole 27. The entire female section which includes the C-shaped plate and the spring, as shown in the preferred embodiment, are secured to a belt loop 33 by means such as rivets 35. The belt loop 33 is secured at its open ends in a standard fashion by means such as rivets 37. This allows for passage of a belt 39 worn by the person who desires to carry the device.

In the preferred embodiment shown, a carrying case 41 is used to carry a portable transceiver 42, or the like. As can be more clearly seen from the remaining figures, the back of the case 41 is strengthened by means of a metal plate to which back 43 is riveted.

Stud 47 is used to connect button 49 to the back of the case. As indicated in FIG. 4, one such connection means uses a washer 52 and screw 53 which mates with a threaded section in a circular termination 46 at the rear end of stud 47.

Button 49 includes an indentation 51 which is substantially vertical and extends across the diameter of button 49. Indentation 51 is of a configuration so as to mate with ridge 31 on leaf spring 23.

As can be seen from FIG. 3, for purpose of initial mating with female section 11 the case is manually rotated so that stud 47 is aligned with its short dimension substantially parallel to the length of slot 29. Lug 47 has for its minor dimension a configuration wherein it is of a slightly smaller dimension than the width of slot 29. Button 49 is of a diameter which is slightly less than the length of the open channel 30 so that, with the button 49 and stud 47 in the position shown in FIG. 3 relative to the female section shown in dotted lines, the two sections may be mated and the case can subsequently be rotated 90° and the two fastening sections will be securely joined together. When case 41 is in the substantially vertical position, it is held in that position by means of engagement between the ridge 31 and the indentation 51 through the bias of a leaf spring 23. This interconnection is more clearly shown in FIG. 5.

As can be seen the semi-locking feature of the ridge 31 and indentation 51 prevents the case from indiscriminately moving about in a bothersome fashion while a person is walking, bending or generally moving in normal work fashion. However, a thoroughly substantial force either by hand, which would be done normally only to remove the case, or by a fairly substantial jolt from contact with some other object, would allow the case to tilt so that the male section rotates with respect to the female section. This is highly desirable since any solid knock could possibly result in either damage to the equipment or possible harm to the individual.

Thus, as can be seen, there is provided by the present invention a significantly easily detachable portable fastening device which additionally provides a means for stabilizing the device which it is in the desired position and maintaining it in that position under normal usage while allowing for additional movement.

It is to be understood that the above specification and drawings are illustrative only since, as discussed above, the device could be used with various components and under various conditions other than in the portable carrying case and belt sustained section as described above. Accordingly, the invention is to be limited only by the scope of the following claims.

We claim:

1. A device for removably and pivotally fastening two devices together comprising
a female section comprising:
a C-shaped plate;
a keyhole through the face of said C-shaped plate, said keyhold including an aperture and adjacent slot;
an open channel in one leg of said C-shaped plate contiguous with said slot;
spring means adjacent one leg of said C-shaped plate and biased toward the inner face of said C-shaped plate;
a ridge secured to said spring means facing said keyhole;
means for mounting said C-shaped plate and said spring means to one of said devices;
a male section comprising:
a button larger than said aperture but having a width less than said open channel;
a flat stud connecting said button to the other one of said two devices, the narrow dimension of said stud having a width less than the width of said slot;
an indentation in the outer face of said button having a geometrical configuration so as to mate with said ridge on said spring means;
wherein said button and said stud may be positioned such that said button passes through said open channel and said stud passes through said slot with said spring means exerting a biasing force against the face of said button; said button and said stud being rotatable within said female section against the force of said spring means so as to engage and disengage said ridge and said indentation.

2. The device of claim 1 further comprising
a belt loop; and
means for securing one of said sections to said belt loop.

3. The device of claim 1 wherein one of said devices comprises a carrying case.

4. A device for removably and pivotally fastening two devices together comprising
a female section including a keyhole;
spring biasing means within said female section;
a ridge supported by said spring biasing means;
an open channel in said female section contiguous with the narrow dimension of said keyhole;
means for mounting said female section to one of said devices;
a male section comprising:
a button larger than said keyhole but having a width less than said open channel;
a flat stud connecting said button to the other one of said two devices, the narrow dimension of said stud having a width less than the narrow dimension of said keyhole;
an indentation in the outer face of said button having a geometrical configuration so as to mate with said ridge on said spring means;
whereby said button and said stud may be positioned such that said stud passes through said narrow dimension of said keyhole with said spring means exerting a biasing force against the face of said button; said button and said stud being rotatable against the force of said spring means so as to engage and disengage said ridge and said indentation.

* * * * *